(12) United States Patent
Kamiya

(10) Patent No.: US 9,729,024 B2
(45) Date of Patent: Aug. 8, 2017

(54) SOLENOID ACTUATOR

(71) Applicant: DENSO CORPORATION, Kariya, Aichi-pref. (JP)

(72) Inventor: Takahito Kamiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/919,134

(22) Filed: Oct. 21, 2015

(65) Prior Publication Data

US 2016/0172927 A1 Jun. 16, 2016

(30) Foreign Application Priority Data

Dec. 12, 2014 (JP) ................. 2014-251656

(51) Int. Cl.
*F16K 27/04* (2006.01)
*H02K 5/22* (2006.01)
*F16K 31/06* (2006.01)

(52) U.S. Cl.
CPC .......... *H02K 5/225* (2013.01); *F16K 27/041* (2013.01); *F16K 31/0613* (2013.01)

(58) Field of Classification Search
CPC ............ Y10T 137/5987; F16K 27/041; F16K 31/0613; H02K 5/225; H02K 15/14
USPC ................................................... 251/129.15
See application file for complete search history.

(56) References Cited

U.S. PATENT DOCUMENTS

| | | | | |
|---|---|---|---|---|
| 3,202,166 A | * | 8/1965 | Butler | F16K 5/0478 137/315.03 |
| 4,537,565 A | * | 8/1985 | Edler | F04B 17/042 310/64 |
| 4,540,154 A | * | 9/1985 | Kolchinsky | F16K 31/408 137/315.03 |
| 5,957,117 A | * | 9/1999 | Everingham | F02M 26/53 123/568.26 |
| 6,053,473 A | * | 4/2000 | Shinobu | F16K 31/0655 123/568.26 |
| 6,119,725 A | * | 9/2000 | Shinobu | F02M 26/48 123/568.26 |
| 6,286,535 B1 | * | 9/2001 | Harms | F15B 13/0402 137/14 |
| 7,886,760 B2 | * | 2/2011 | Groschel | F16K 31/06 137/315.03 |

(Continued)

FOREIGN PATENT DOCUMENTS

DE   102010060180 A1   4/2012
EP       2136041 A2   12/2009

*Primary Examiner* — Matthew W Jellett

(57) ABSTRACT

A solenoid actuator is mountable to a mounting surface of an engine, such that an accommodated portion is inserted into the engine, and an exposed portion is located outside the engine. An operating portion operates when a solenoid actuator portion is energized and de-energized. A main body forms at least a part of an outer shell of the exposed portion. A connector portion is projected from the main body in the exposed portion. The connector portion is connected with a wiring for the solenoid actuator portion. At least one protrusion is projected radially outward from a sidewall of the main body in the exposed portion. The at least one protrusion is located at a position different from the connector portion in a circumferential direction of the sidewall. The at least one protrusion forms a clearance with the mounting surface in an axial direction.

11 Claims, 8 Drawing Sheets

(56) References Cited

U.S. PATENT DOCUMENTS

| | | | | |
|---|---|---|---|---|
| 8,704,417 B2* | 4/2014 | Kamogi | ............... | H01R 12/523 |
| | | | | 310/68 D |
| 2015/0295478 A1* | 10/2015 | Creviston | .......... | H02K 11/0094 |
| | | | | 310/68 D |
| 2016/0032795 A1* | 2/2016 | Yahagi | .................... | F01L 1/352 |
| | | | | 123/90.11 |

* cited by examiner

SOLENOID ACTUATOR

CROSS REFERENCE TO RELATED APPLICATION

This application is based on reference Japanese Patent Application No. 2014-251656 filed on Dec. 12, 2014, the disclosure of which is incorporated herein by reference.

TECHNICAL FIELD

The present disclosure relates to a solenoid actuator mounted on an engine.

BACKGROUND

A conventionally known solenoid actuator is inserted through a mounting hole, which is formed in an outer wall of the engine, into an interior of the engine. Specifically, the solenoid actuator has an accommodated portion and the exposed portion. The accommodated portion is inserted into the interior of the engine. The exposed portion is other than the accommodated portion and is located outside the engine, such that the exposed portion is mounted onto an outer surface of the outer wall of the engine. The outer surface functions as a mounting surface. For example, Patent Document 1 discloses a solenoid actuator including an operation axis and a solenoid actuator portion. The operation axis is configured to bias one end of a spool of a hydraulic pressure control valve, which is equipped in an interior of an engine. The solenoid actuator advance and retreat the operation axis when energized and de-energized thereby to switch the hydraulic pressure control valve. The exposed portion of the solenoid actuator is equipped with a connector portion. The connector portion is connected with a wiring of the solenoid actuator. In general, the connector portion may be formed of resin in consideration of an electrically insulative property.

(Patent Document 1)

Publication of German unexamined patent application No. DE 10 2010 060 180 A1

An operator may remove a solenoid actuator from an engine for maintenance work or the like. In a case where an exposed portion of a solenoid actuator has a height in the axial direction enough, an operator may be enabled to hold an outer shell of the exposed portion steadily. It is noted that, the exposed portion of the solenoid actuator in Patent Document 1 may be in a flat shape to have a low height in the axial direction. Therefore, when an operator removes the solenoid actuator, which has the flat-shaped exposed portion, from an engine for a maintenance work and/or the like, the operator may hardly grip an outer shell of the flat-shaped exposed portion. Therefore, the operator may grip a connector portion projected from the exposed portion. Consequently, stress may be caused due to the weight of the solenoid actuator portion and/or the like, and the stress may be applied to the connector portion. Thus, the connector portion, which is formed of resin, may be damaged. In addition, a wiring connected to the connector portion may be disconnected. In addition, an operator may insert a tool into a clearance between the solenoid actuator and the engine and may wrench the solenoid actuator. Consequently, the main body of the solenoid actuator may be damaged. In a case where a main portion of the exposed portion is formed of resin, the main body may cause crack and/or breakage.

SUMMARY

It is an object of the disclosure to produce a solenoid actuator configured to protect a connector portion and/or the like from breakage and to facilitate workability when being removed from an engine.

According to an aspect of the present disclosure, a solenoid actuator is configured to be mounted to a mounting surface, which is an outer surface of an outer wall of an engine, such that an accommodated portion is inserted through a mounting hole, which is formed in the outer wall, into an interior of the engine, and such that an exposed portion, which is other than the accommodated portion, is located outside the engine. The solenoid actuator includes a solenoid actuator portion configured to generate an electromagnetic force when energized, an operating portion configured to operate when the solenoid actuator portion is energized and de-energized, a main body forming at least a part of an outer shell of the exposed portion, a connector portion projected from the main body in the exposed portion, the connector portion configured to be connected with a wiring for the solenoid actuator portion, and at least one protrusion projected radially outward from a sidewall of the main body in the exposed portion. The at least one protrusion is located at a position different from the connector portion in a circumferential direction of the sidewall, the at least one protrusion configured to form a clearance with the mounting surface in an axial direction. Therefore, the above object can be obtained.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

A solenoid actuator according to embodiments of the present disclosure will be described with reference to FIGS. 1 to 4.

(First Embodiment)

A solenoid actuator according to a first embodiment of the present disclosure will be described with reference to FIGS. 1 to 4.

Figure 2:
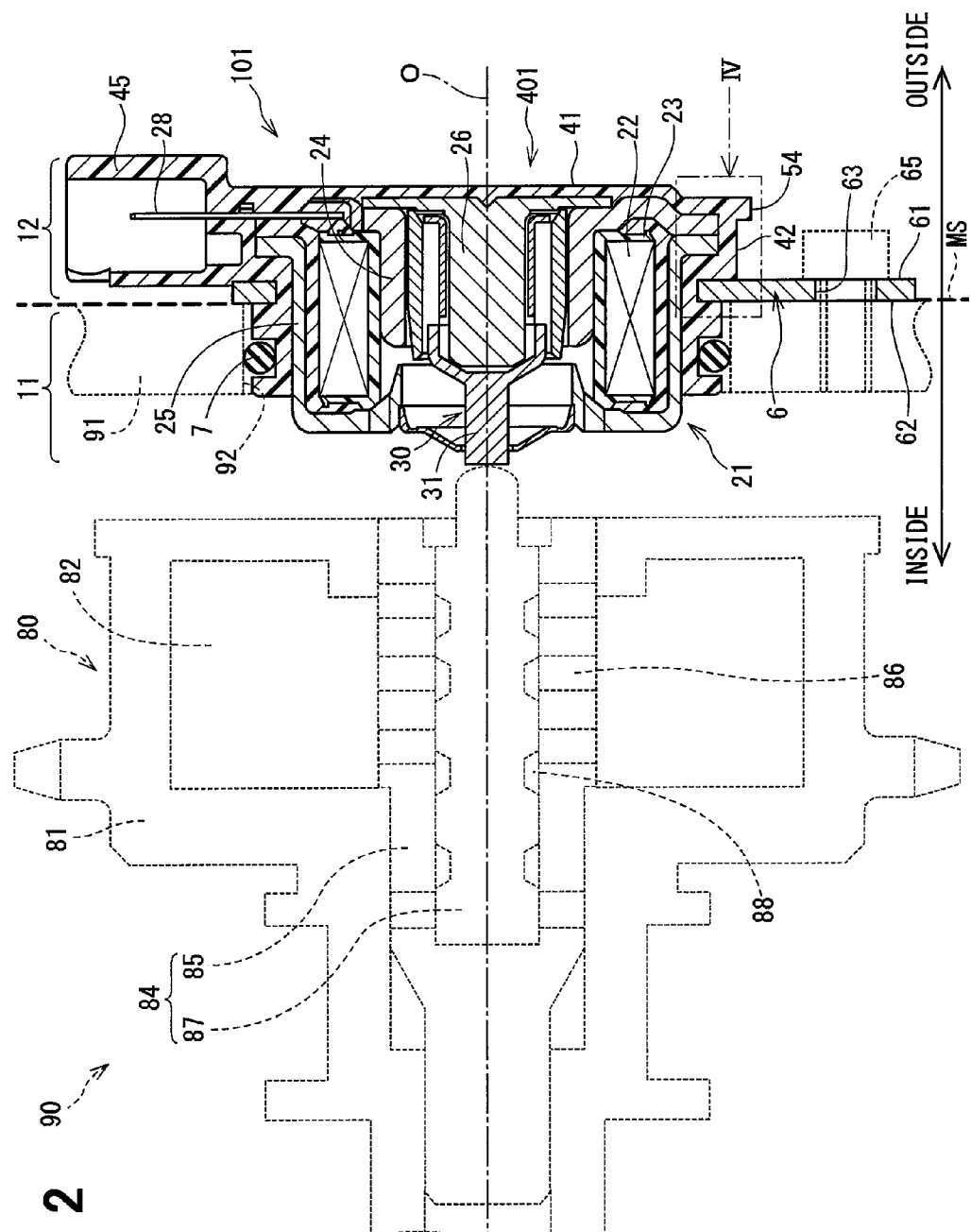
FIG. 2 is a sectional view taken along a line II-O-P and a line Q-II in FIG. 1, the sectional view showing the solenoid actuator mounted to the engine.

As shown in FIG. 2, a solenoid actuator 101 is mounted on a mounting surface MS. The mounting surface MS is an outer surface of an outer wall 91 of an engine 90. The solenoid actuator 101 is roughly divided into an accommodated portion 11 and an exposed portion 12. The accommodated portion 11 is inserted into an interior of the engine 90 through a mounting hole 92. The mounting hole 92 is formed in the outer wall 91 of the engine 90. The exposed portion 12 is other than the accommodated portion 11. The exposed portion 12 is located outside the engine 90.

In FIG. 2, dashed lines show a functional component located inside the engine 90. The functional component includes a valve timing control apparatus 80 and a hydraulic pressure control valve 84. The valve timing control apparatus 80 may be a generally-known device. The hydraulic pressure control valve 84 is integrated inside the valve timing control apparatus 80. The hydraulic pressure control valve 84 is coaxial with a center axis O of the solenoid actuator 101. The center axis O is in parallel with an axial direction.

The valve timing control apparatus 80 includes, for example, a housing 81 and a vane rotor 82. The housing 81 rotates in synchronization with the crankshaft. The vane rotor 82 rotates integrally with the camshaft. The valve timing control apparatus 80 controls a relative rotational phase between the housing 81 and the vane rotor 82. Thus, the valve timing control apparatus 80 controls an opening-and-closing timing of an intake valve and/or an exhaust valve of the engine toward an advance side or a retard side.

The hydraulic pressure control valve 84 is a spool valve including a sleeve 85 and a spool 87. The sleeve 85 has multiple ports 86. The spool 87 includes lands forming multiple annular grooves 88 therebetween. The hydraulic pressure control valve 84 manipulates an axial position of the spool 87 in the axial direction thereby to open and close the multiple ports 86 selectively. In this way, the hydraulic pressure control valve 84 switches hydraulic pressure paths to rotate the vane rotor 82 in the advance direction or the retard direction. It is noted that, FIG. 2 simply illustrates an overview of the ports 86 and the annular grooves 88. In FIG. 2, the positions and/or the number of the ports 86 and the annular grooves 88 may not be necessarily accurate. The solenoid actuator 101 is used to switch the hydraulic pressure control valve 84.

The solenoid actuator 101 includes the solenoid actuator portion 21, an operation axis 31, a main body 401, a connector portion 45, protrusions 51 to 54, a bracket 6, and/or the like. The solenoid actuator portion 21 generates an electromagnetic force such as an attraction force and/or a repulsive force when being energized. The operation axis 31 may be equivalent to an operating portion. The operating portion is operative by controlling electricity supply to the solenoid actuator portion 21. In the present embodiment, the operation axis 31 is a part of the moving core 30. The operation axis 31 moves back and forth in the axial direction thereby to bias one end of the spool 87 and to manipulate the axial position of the spool 87.

Specifically, the solenoid actuator portion 21 includes a coil 22, a bobbin 23, a coil core 24, a yoke 25, a stationary core 26, and the like. The coil core 24, the yoke 25, and the stationary core 26 are formed of a ferrous material such as a soft magnetism material. Similarly, the moving core 30 is formed of a ferrous material such as a soft magnetism material. The operation axis 31 may be formed of either a magnetic material or a nonmagnetic material. In the present configuration, most of the solenoid actuator portion 21 including the coil 22 comprises metallic components. Therefore, the solenoid actuator portion 21 is relatively high in weight.

The coil 22 is formed by winding a wire around an outer circumferential periphery of a bobbin 23. The bobbin 23 is fitted to an outer periphery of the coil core 24. The bobbin 23 is formed of resin to insulate the coil core 24 from an inner circumferential periphery of the coil 22. An outer circumferential periphery of the coil 22 is molded of a resin material integrally with the main body 401 thereby being insulated.

The coil 22 receives electricity supplied from an external electric power source through a terminal 28 of the connector portion 45 thereby to generate a magnetic field. The magnetic field causes a magnetic flux passing through, for example, the yoke 25, the coil core 24, and the stationary core 26 thereby to cause the stationary core 26 to generate an electromagnetic attraction force. Consequently, a moving core 30, which is opposed to the stationary core 26, is drawn toward the stationary core 26. In this way, the electromagnetic attraction force is generated. A return spring ((not shown)) is equipped in the solenoid actuator 101 or the hydraulic pressure control valve 84 to generate a biasing force. The electromagnetic attraction force generated in this way and the biasing force of the return spring manipulate the operation axis 31 of the moving core 30 to moves back and forth in the axial direction in response to switching of electricity supplied to the solenoid actuator portion 21. Detailed configuration and operation of the solenoid actuator portion 21 may be arbitrarily modified and embodied.

At least a part of the main body 401 form an outer shell of the exposed portion 12. In particular, according to the present embodiment, the main body 401 includes a portion of the accommodated portion 11, which is resin-molded with the solenoid actuator portion 21, and a portion, which forms an outer shell of the exposed portion 12. Both the portions of the accommodated portion 11 and the exposed portion 12 are integrally molded of resin. The outer shell of the exposed portion 12 is substantially in a tubular shape at a low height. The outer shell of the exposed portion 12 has a principal surface 41 and a sidewall 42. The resin material may be excellent in heat resistance, chemical resistance, and/or the like. The resin material may be, for example, polyphenylene sulfide (PPS). When the component is molded of resin, molding dies may have, for example, a degassing configuration to facilitate resin flow and to restrain formation of a void.

The connector portion 45 is a part of the exposed portion 12 and is projected from the main body 401. The connector portion 45 is connected with a wiring of the solenoid actuator portion 21. Generally, a connector portion may be formed of resin for insulation. It is noted that, the connector portion 45 of the present embodiment is, In particular, formed of a resin material integrally with the main body 401.

The bracket 6 is insert-molded with an outer circumferential periphery of the main body 401. The bracket 6 is in a plate shape and has a bolt hole 63. In addition, a seal ring 7 is equipped to an outer circumferential periphery of the accommodated portion 11 of the main body 401. The seal ring 7 is fitted to an inner wall of the mounting hole 92. When mounting the solenoid actuator 101 on the engine 90, the accommodated portion 11 is first inserted through the mounting hole 92. Subsequently, a rear surface 62 of the bracket 6 is made to contact with the mounting surface MS of the engine 90. Subsequently, a bolt 65 is inserted through the bolt hole 63 from the side of an outer surface 61 thereby to screw the solenoid actuator 101 onto the outer wall 91.

The exposed portion 12 of the main body 401 is formed relatively in a flat shape to have a low height in the axial direction. In the example, the hydraulic pressure control valve 84 is integrally equipped in the interior of the valve timing control apparatus 80 to have an integrated configuration. In another case, a hydraulic pressure control valve may be provided separately from a valve timing control apparatus to have a separated configuration. The valve timing control apparatus 80 and the hydraulic pressure control valve 84 having the integrated configuration are mounted to the engine 90 in the mounting method as described above. This mounting method is employed in consideration of a severe constrain in an accommodation space of the engine 90 in the axial direction, compared with the separated configuration.

As in the present example, the exposed portion 12 is in a flat shape. It may be assumable that an operator removes the solenoid actuator 101 from the engine 90 in, for example, a maintenance work or the like. In such a maintenance work, an operator may hardly hold the outer shell of the main body 401. Therefore, an operator may hold the projected connector portion 45. Consequently, stress may occur due to a weight of the solenoid actuator portion 21 and/or the like, and the stress may be applied to the connector portion 45. Thus, the connector portion 45, which is formed of resin, may be damaged. In addition, the wiring connected to the connector portion 45 may be disconnected. Furthermore, an operator may insert a tool into a clearance between the bracket 6 and the engine outer wall 91 and may wrench the bracket 6 to raise the bracket 6. In such a case, a crack may occur in the main body 401 to result in breakage of the main body 401.

The present embodiment employs the protrusions 51 to 54. The protrusions 51 to 54 may protect the connector portion 45 and/or the like from breakage in such a removal process and may enhance workability in the removal process. The protrusions 51 to 54 are located in the exposed portion 12 and are equipped to the sidewall 42 of the main body 401. The protrusions 51 to 54 are located at positions different from the position of the connector portion 45 in the circumferential direction. The protrusions 51 to 54 are located at positions to form a clearance with the mounting surfaces MS in the axial direction. The protrusions 51 to 54 are projected from the sidewall 42 radially outward. In the present embodiment, the protrusions 51 to 54 are also molded of a resin material integrally with the main body 401.

Figure 1:
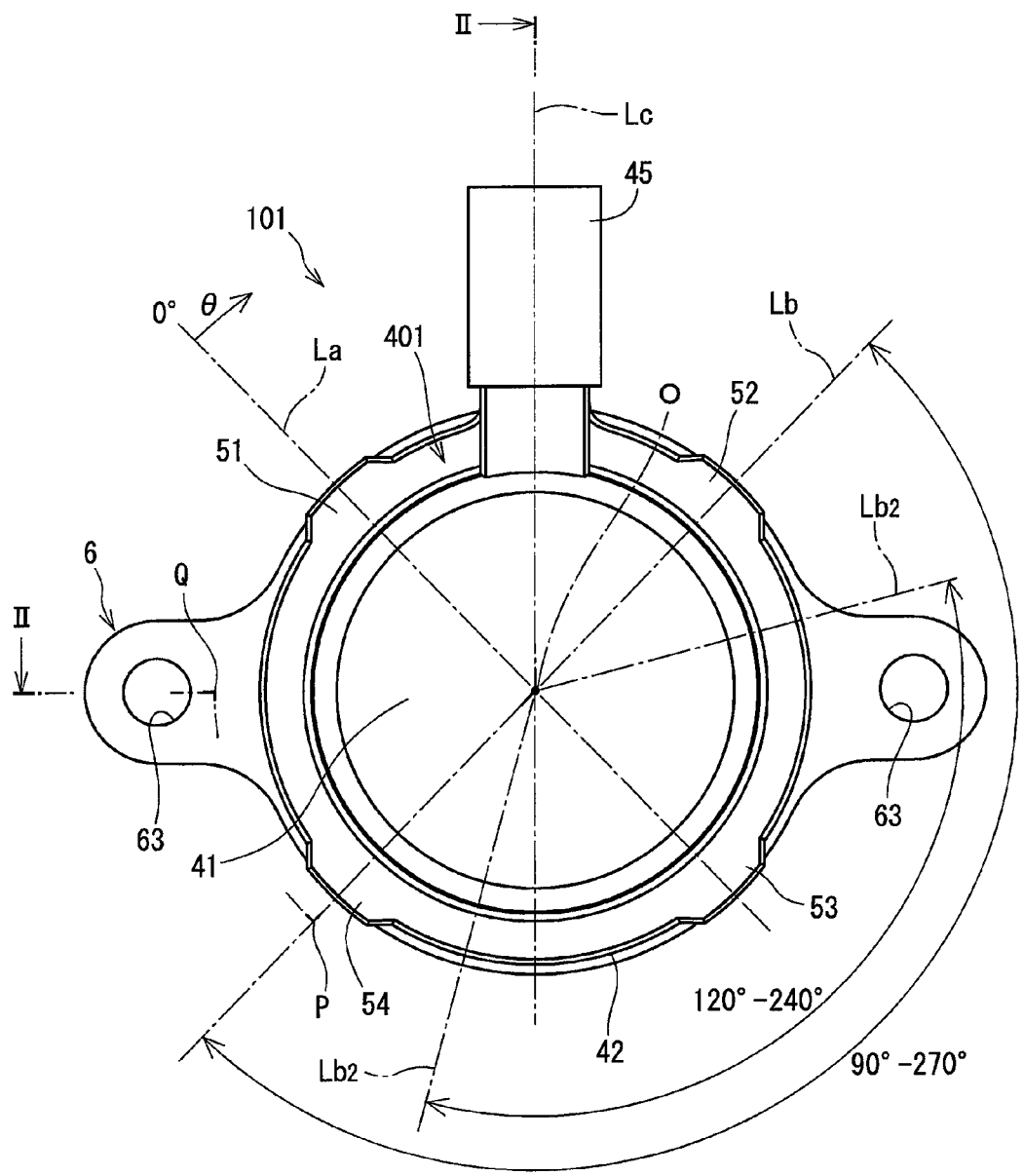
FIG. 1 is a front view showing a solenoid actuator according to a first embodiment of the present disclosure.
Figure 3:
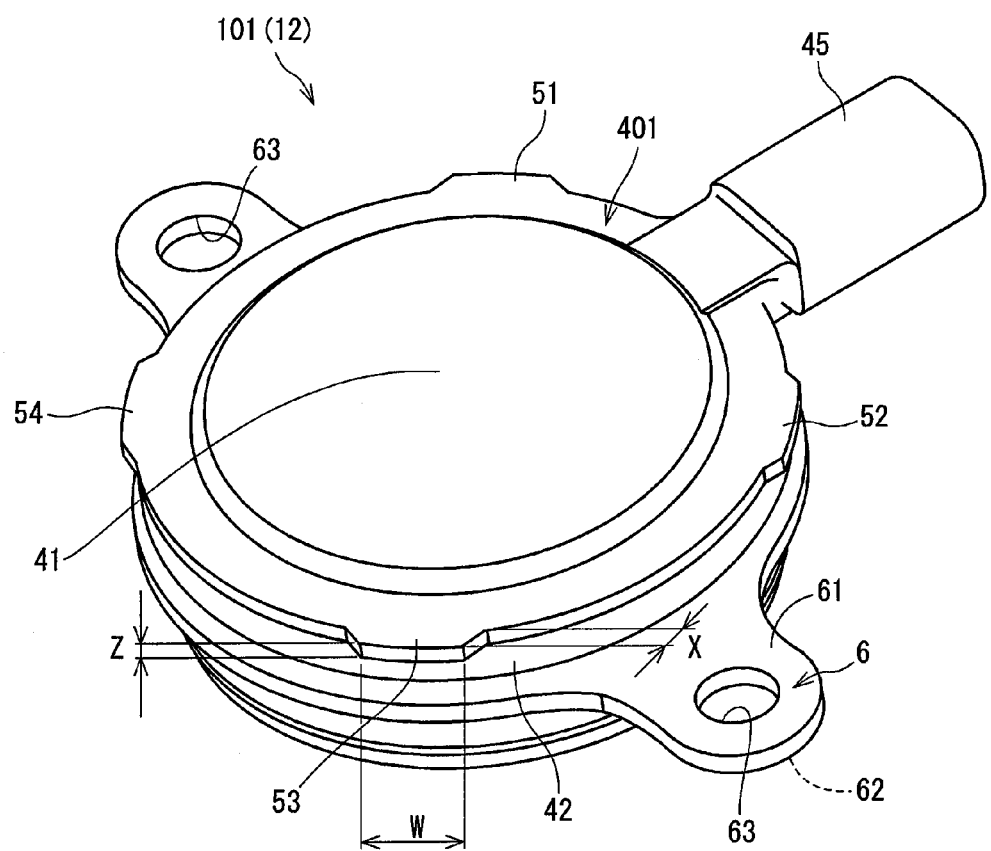
FIG. 3 is a perspective view showing an exposed portion of the solenoid actuator.

Subsequently, the configuration of the protrusions 51 to 54 will be described in detail. As shown in FIGS. 1 and 3, according to the first embodiment, four protrusions 51 to 54 are located at intervals about 90 degrees. In addition, the four protrusions 51 to 54 are located symmetrically relative to a symmetrical line Lc. The symmetrical line Lc connects the center axis O with the connector portion 45. That is, the protrusions 51 to 54 are angled at about 45-degree angle, about 135-degree angle, about 225-degree angle, and about 315-degree angle, respectively, with respect to the symmetrical line Lc. Thus, the protrusions 51 to 54 are located at a distant position from the connector portion 45.

The protrusion on the left upper side in the drawing is denoted with 51. The other protrusions are denoted with 52, 53, and 54 along the clockwise direction in the drawing. The protrusion 51 is, for example, selected as a particular protrusion. On a flat surface, which is perpendicular to a center axis O of the main body 401, a base line La is a straight line, which connects the particular protrusion 51 with the center axis O, and a boundary line Lb is a straight line, which is perpendicular to the base line La and passes through the center axis O. The flat surface perpendicular to the center axis O of the main body 401 corresponds to the plane of FIG. 1. The protrusion 53 may correspond to at least one protrusion other than the particular protrusion 51. The protrusion 53 is located on the opposite side of the boundary line Lb from the particular protrusion 51.

The particular protrusion 51 extends along a reference direction of the base line La at 0 degree. The angle θ is defined to increase in the clockwise direction relative to the reference direction. A range of θ between 90 degrees and 270 degrees define a range encompassing an opposite side of the boundary line Lb. The protrusion 53 is located at θ about 180 degrees, which is the center of the range. In addition, protrusions 51 and 53 are located across the center axis O. Therefore, an operator is enabled to hook a finger on the multiple protrusions 51 and 53 to grip the main body 401 evenly.

Other boundary lines Lb2 are straight lines extending in directions at ±120 degrees, respectively, relative to the base line La. The boundary lines Lb2 pass through the center axis O. The protrusion 53 is located on the opposite side of the boundary line Lb2 from the protrusion 51. That is, the protrusion 53 is located in a range of θ between 120 degrees and 240 degrees. The range of θ between 120 degrees and 240 degrees may be desirable in view of enabling an operator to grip the main body 401 with sufficient balance.

The dimensions of the protrusions 51 to 54 may be as follows. For example, in FIG. 3, the diameter of the main body 401 may be about 60 mm. The width W of each of the protrusions 51 to 54 in the circumferential direction may be about 10 mm. The thickness Z of each of the protrusions 51 to 54 in the axial direction may be about 2 mm. The projection length X of each of the protrusions 51 to 54 in the radial direction may be about 2 mm. It is noted that, the above-described dimensions are one example. The dimensions of the protrusion 51 to 54 may be arbitrarily determined in consideration of, for example, the diameter of the main body, the weight of the solenoid actuator, the size of an operator, a working environment of an operator, and/or the like. It is noted that, in a case where the protrusion is excessively small, the small protrusion may exert a burden on a fingertip of an operator. Therefore, desirably, the protrusion may have, for example, the width W greater than or equal to 5 mm in the circumferential direction, the thickness Z greater than or equal to 0.5 in the axial direction, and the projection length X greater than or equal to 0.5 in the radial direction.

Figure 4:
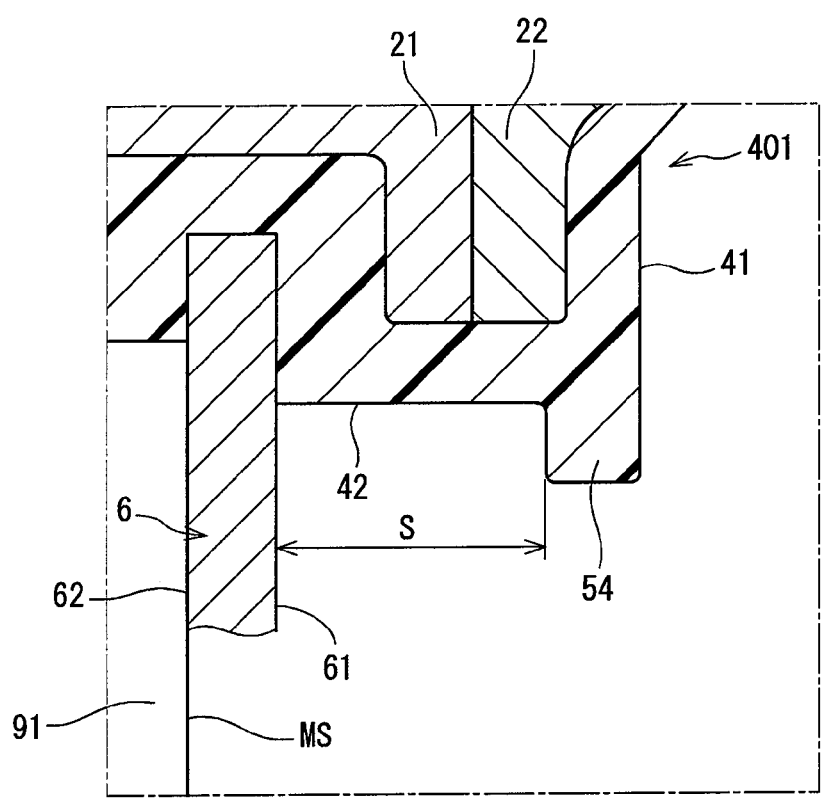
FIG. 4 is an enlarged sectional view showing a section denoted by IV in FIG. 2.

Subsequently, an axial position of the protrusion will be described with reference to FIG. 4. FIG. 4 is an enlarged view of a section IV in FIG. 2. Herein, the protrusion 54 will be described as a representative one of the four protrusions. As shown in FIG. 4, the protrusion 54 is located at an end of the sidewall 42 of the main body 401 on the opposite side of the mounting surface MS. The protrusion 54 is located along the principal surface 41.

It is noted that, in present embodiment, the bracket 6 is equipped to the entire circumferential periphery of the main body 401. A clearance between the protrusion and the mounting surface MS may be equivalent to or considered as a clearance S between the protrusion 54 and the bracket 6. For example, in an embodiment in which a bracket is equipped locally to the main body and in which a bracket does not exist directly below the protrusion, the clearance S in FIG. 4 may be represented as a clearance between the protrusion and the mounting surface MS.

(Effect)

As follows, an effect of the solenoid actuator 401 of the present embodiment will be described.

(1) In the solenoid actuator 401, the protrusions 51 to 54 are located in the exposed portion 12 and are equipped to the sidewall 42 of the main body 401. The protrusions 51 to 1 are located at positions different from the position of the connector portion 45 in the circumferential direction. The protrusions 51 to 54 are located at positions to form a clearance with the mounting surfaces MS in the axial direction. The protrusions 51 to 54 are projected from the sidewall 42 radially outward.

The present configuration may enable an operator to hook a finger on the protrusions 51 to 54 and to grasp the main body 401 easily in a process to remove the solenoid actuator 101 from the engine 90. The protrusions 51 to 54 are located at positions distant from the connector portion 45 in the circumferential direction. Therefore, the present configuration may protect the connector portion 45 from transmission of a stress caused by the weight of the solenoid actuator portion 21, and/or the like in the process to remove the solenoid actuator 101.

Therefore, the present configuration may protect the main body 401 from damage due to a stress, which is caused by an operator holding the connector portion 45 and applied to the connector portion 45. In addition, the present configuration may protect the main body 401 from cracking and breakage caused by an operator inserting a tool into the clearance to wrench the main body 401. Therefore, the present configuration may protect the connector portion 45 and/or the like from breakage and may enhance workability.

(2) The present configuration includes the multiple protrusions 51 to 54. In the first embodiment, the four protrusions 51 to 54 are equipped. Therefore, the present configuration may enable an operator to grip the main body 401 further easily.

(3) The protrusion 51 may be equivalent to the particular protrusion. The protrusion 53 may be equivalent to a protrusion other than the particular protrusion. In FIG. 1, the protrusion 53 is located on the opposite side of the boundary line Lb from the particular protrusion 51. The present configuration may enable an operator to hook a finger on the multiple protrusions 51 and 53, which are located to interpose the center axis O therebetween, and to grip the main body 401 with sufficient balance.

(4) The protrusions 51 to 54 are located at the end of the sidewall 42 of the main body 401 on the opposite side of the mounting surface MS. The protrusions 51 to 54 are located along the principal surface 41. The present configuration may enable to form the clearance S between the protrusion 54 and the bracket 6 by a large length. Therefore, the present configuration may enable an operator to hook fingers onto the protrusion 54 and to grip the main body 401.

(5) The protrusions 51 to 54 are integrally formed with the main body 401. The present configuration may enable to reduce the number of components, a manufacturing process, and/or the like.

(6) The connector portion 45 and the main body 401 are integrally formed of a resin material. The present configuration may enable to reduce the number of components, a manufacturing process, and/or the like.

(7) The operation axis 31 of the solenoid actuator 101 is configured to switch the hydraulic pressure control valve 84. The hydraulic pressure control valve 84 is integrally mounted in the interior of the valve timing control apparatus 80. In general, in case where the valve timing control apparatus 80 is integrated with the hydraulic pressure control valve in the engine 90, a space of the engine 90 may be severely restricted in the axial direction. Therefore, the height of the exposed portion 12 of the solenoid actuator 101 may tend to be set small in the axial direction. Therefore, the present configuration may produce the effects (1) to (4) significantly.

(Second Embodiment)

Figure 5:
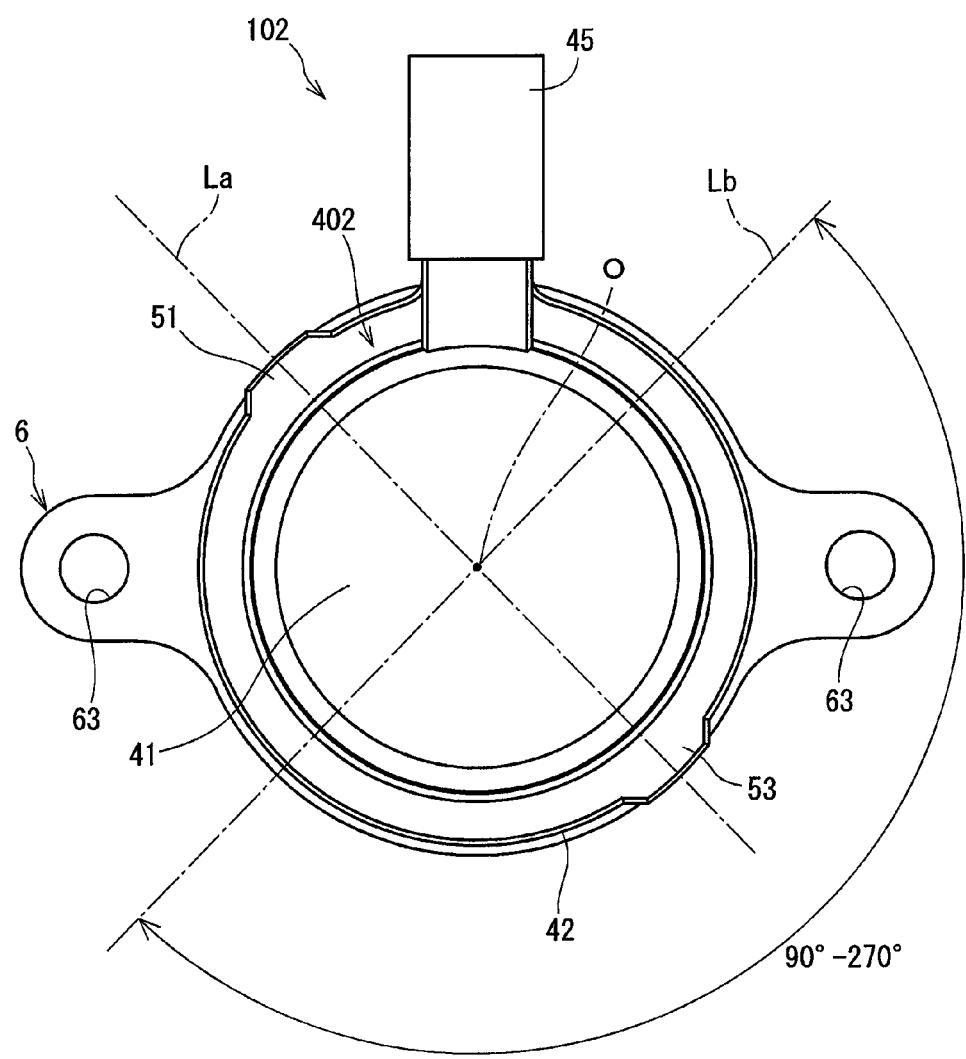
FIG. 5 is a front view showing a solenoid actuator according to a second embodiment of the present disclosure.

A solenoid actuator according to a second embodiment of the present disclosure will be described with reference to FIG. 5. In the solenoid actuator 101 of the first embodiment, the protrusions 51 to 54 are equipped at four locations (refer to FIG. 1). To the contrary, in a solenoid actuator 102 of the second embodiment, the protrusions 51 and 53 are equipped at two locations. In the example of FIG. 5, two protrusions 51 and 53 are equipped on the upper left side and on the lower right side relative to the center axis O in the drawing. The size of each of the protrusions 51 and 53 is equivalent to that in the first embodiment. The protrusion 53 is located on the opposite side of the boundary line L1 from the particular protrusion 51. That is, the protrusion 53 is at 180 degrees from the particular protrusion 51. The second embodiment may produce effects similarly to the first embodiment.

(Third Embodiment)

Figure 6:
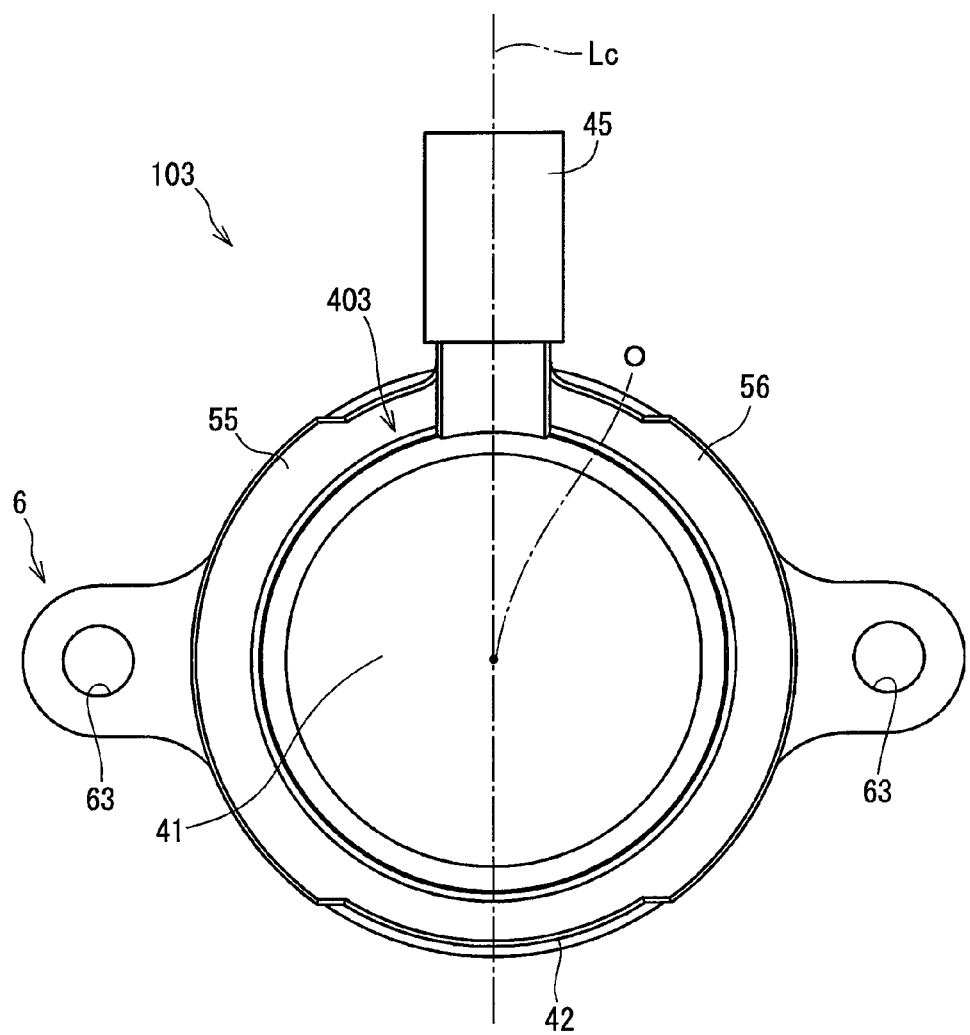
FIG. 6 is a front view showing a solenoid actuator according to a third embodiment of the present disclosure.

A solenoid actuator according to a third embodiment of the present disclosure will be described with reference to FIG. 6. A main body 403 of a solenoid actuator 103 according to the third embodiment has two protrusions 55 and 56 at two locations in the circumferential direction. Each of the two protrusions 55 and 56 is greater in the circumferential direction than that of the first and second embodiments. The protrusions 55 and 56 are symmetric with each other about a symmetrical line Lc. The symmetrical line Lc connects the center axis O with the connector portion 45. In this way, a ratio between the width of the protrusion in the circumferential direction and the peripheral length of the main body may be arbitrarily determined in dependence upon various conditions.

(Other Embodiment)

(a) In the first to third embodiments, the protrusions 51 to 56 are equipped at four locations or at two locations. It is noted that, the protrusion may be equipped at one location or may be equipped at two or more locations. In case where the protrusion includes multiple protrusions, the protrusions may be located at three locations or may be located at five or more locations. The sizes and/or the shapes of the multiple protrusions may be non-uniform. The multiple protrusions may be at uneven distances from each other in the circumferential direction.

Figure 7:
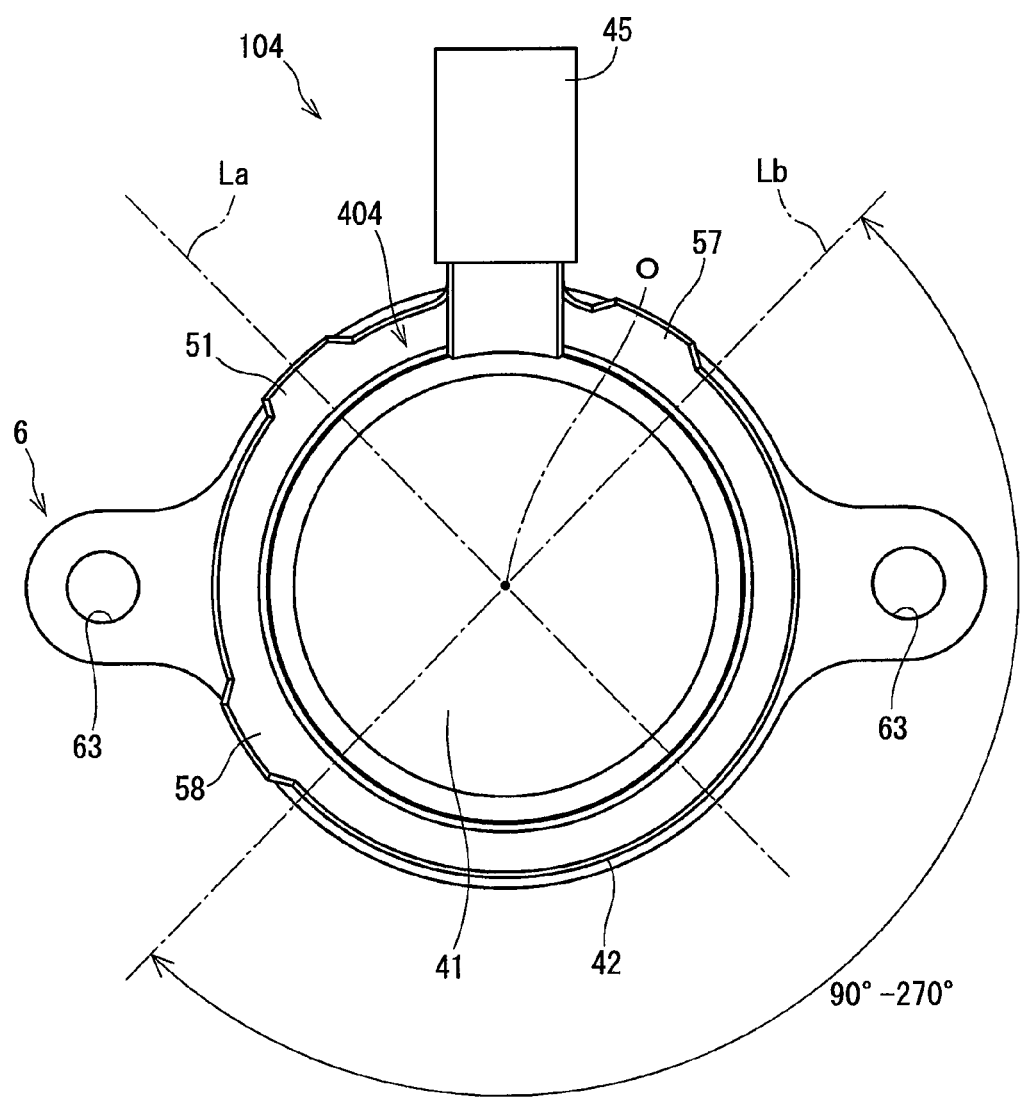
FIG. 7 is a front view showing a solenoid actuator according to an other embodiment of the present disclosure.

(b) In an embodiment, in which multiple protrusions are equipped, as described in the first embodiment with reference to FIG. 1, at least one other protrusion 53 is located on the opposite side of the particular protrusion 51 across the boundary line Lb. It is noted that, for example, it may be assumable that an object may exist on an extension line of the protrusion 53 in FIG. 1 to interfere with a hand of an operator. In consideration of that case, as exemplified by a solenoid actuator 104 in FIG. 7, the particular protrusion 51 and other protrusions 57 and 58 may be equipped to a main body 404 on the same side relative to the boundary line L1.

Figure 8:
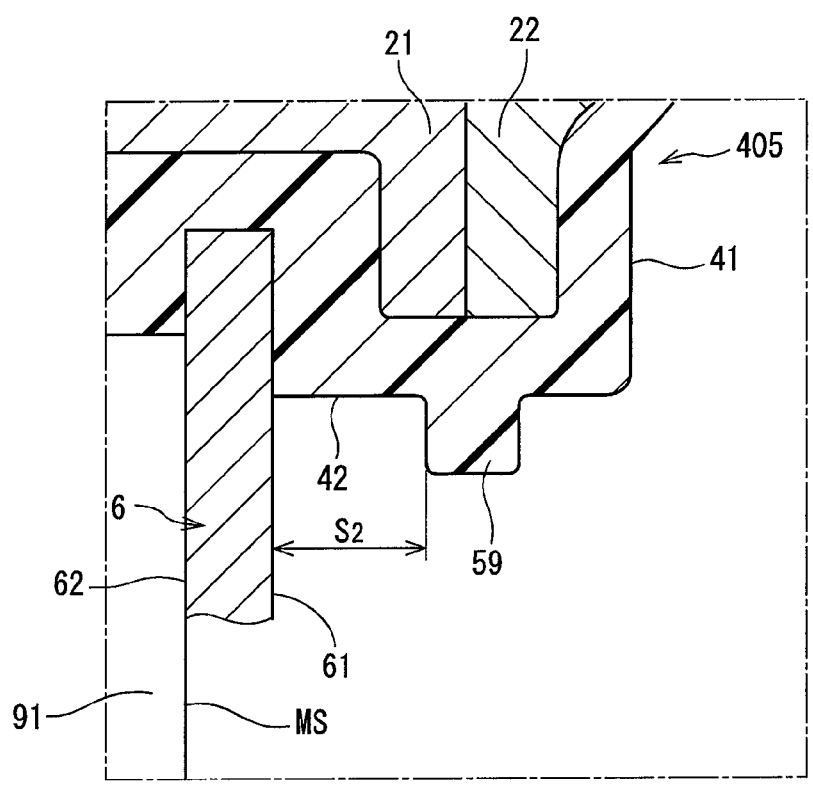
FIG. 8 is an enlarged sectional view showing a section of a solenoid actuator according to an other embodiment of the present disclosure.

(c) The location of the protrusion in the axial direction may be determined as follows. As described in the first embodiment with reference to FIG. 4, the protrusion 54 may be located at an end of the sidewall 42 of the main body 401 on the opposite side of the mounting surface MS. The protrusion 54 is located along the principal surface 41. It is noted that, as shown in FIG. 8, in a case where a clearance S2 is formed between a protrusion 59 and the bracket 6 to enable an operator to grip a main body 405 easily, the protrusion 59 may be equipped at an intermediate portion of the sidewall 42 of the main body 405. For example, the protrusion 59 may be equipped at an intermediate portion of the sidewall 42 in a case where it is advantageous in consideration of convenience of determining a divisional surface between forming dies.

(d) The protrusion is not limited to be integrally molded with the main body as exemplified in the embodiments. The protrusion may be a separated component equipped to the main body. The separated component may be in, for example, a pin-shape or a bit-shape. Therefore, a ready-made solenoid actuator without the protrusion may be made in advance and may be modified by equipping the protrusion to a main body of the ready-made solenoid actuator thereby to manufacture a product having the protrusion.

(e) The main body is not limited to a resin molded product. The main body may be formed of various materials and/or may be formed by various forming methods. The main body may be formed by, for example, cutting a resin component, by casting a metallic material, by bending a metallic plate, by cutting a resin or metallic material, and/or by sintering a ceramic material. The main body may be formed of an electrically conductive material, such as a metallic material and/or the like. In such a case, the connector portion may be formed of an electrically non-conductive material, such as resin, and may be formed separately from the main body, in view of an electrically insulating property.

(f) The solenoid actuator exemplified above is to switch the hydraulic pressure control valve 84 (refer to FIG. 2), which is integrally equipped in the interior of the valve timing control apparatus 80. The solenoid actuator of the present disclosure is not limited to the above example. The solenoid actuator may manipulate a functional component, which is equipped to an engine, other than the hydraulic pressure control valve. The solenoid actuator exemplified above has an operational mode to move the operation axis 31 back and forth in the axial direction. The operational mode of the solenoid actuator is not limited to the above example. The solenoid actuator may have an operational mode to move an object back and forth in a direction other than the axial direction. The solenoid actuator may have an operational mode to rotate an object.

The solenoid actuator according to the present disclosure is inserted through the mounting hole, which is formed in the outer wall of the engine, into the interior of the engine. Specifically, the solenoid actuator has the accommodated portion and the exposed portion. The accommodated portion is inserted into the interior of the engine. The exposed portion is other than the accommodated portion and is located outside the engine, such that the exposed portion is mounted onto the outer surface of the outer wall of the engine. The outer surface functions as the mounting surface.

The solenoid actuator includes the solenoid actuator portion, the operating portion, the main body, the connector portion, and the at least one protrusion. The solenoid actuator portion generates electromagnetic force when energized. The operating portion is configured to operate by switching between energization and de-energization of the solenoid actuator portion.

The main body forms at least a part of the outer shell of the exposed portion.

The connector portion is projected from the main body in the exposed portion. The connector portion is connected with the wiring for the solenoid actuator portion.

The at least one protrusion is located at the position of the sidewall different from the connector portion in the circumferential direction of the sidewall. The at least one protrusion is located at the position to form the clearance with the mounting surface in the axial direction. The at least one protrusion is projected radially outward from the sidewall of the main body in the exposed portion.

The present configuration may enable an operator to hook a finger on the protrusion and to grip the main body easily in the process to remove the solenoid actuator from the engine. The protrusion is equipped to the position distant from the connector portion in the circumferential direction. Therefore, the present configuration may enable to restrict the stress, which is caused by the weight of the solenoid actuator portion and the like, from transmitting to the connector portion in the process to remove the solenoid actuator from the engine. Therefore, the present configuration may restrict an operator from gripping the connector portion to apply stress onto the connector portion. Thus, the present configuration may protect the connector portion from breakage. In addition, the present configuration may restrict an operator from inserting a tool into the clearance to wrench the main body. Thus, the present configuration may protect the main body from causing a crack and/or breakage. In this way, the present configuration may protect the connector portion and/or the like from breakage and may enhance workability.

For example, a hydraulic pressure control valve may be integrally mounted in an interior of a valve timing control apparatus. In addition, an engine may be equipped with the valve timing control apparatus. This configuration may severely regulate a space in the axial direction. Consequently, the height of the exposed portion of the solenoid actuator may be determined as small as possible in the axial direction. The configuration of the present disclosure may be applied to a solenoid actuator including an exposed portion in a flat shape.

From a viewpoint to facilitate an operator to grip the protrusion, the multiple protrusions may be equipped. In this case, one protrusion among the multiple protrusions may be the particular protrusion. In addition, the base line (La) may be the straight line connecting the particular protrusion with the center axis in the flat surface, which is perpendicular to the center axis of the main body. In addition, the boundary line (Lb) may be the straight line, which is perpendicular to the base line and passes through the center axis. In addition, at least one protrusion other than the particular protrusion may be located on the opposite side of the boundary line from the particular protrusion. In addition, the protrusion may be equipped to the sidewall of the end of the main body and may be located on the opposite side of the mounting surface in the axial direction.

It is noted that, in a case where determination whether a certain product encompasses elements of the present disclosure is made, the determination need not be made in a condition where the certain product is mounted on an engine. The certain product may be assumed to have a mounting member such as a bracket, which is used when the certain product is mounted to the engine. Therefore, the position of the mounting surface on the side of the engine may be deemed from the mounting member as a reference of the position. In addition, the boundary position between the accommodated portion and the exposed portion may be identified. Therefore, it may suffice to determine whether a certain product encompasses elements of the present disclosure only with the certain product without an engine or another object.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A solenoid actuator configured to be mounted to a mounting surface, which is an outer surface of an outer wall of an engine, such that an accommodated portion is inserted through a mounting hole, which is formed in the outer wall, into an interior of the engine, and such that an exposed portion, which is other than the accommodated portion, is located outside the engine, the solenoid actuator comprising:
   a solenoid actuator portion configured to generate an electromagnetic force when energized;
   an operating portion configured to operate when the solenoid actuator portion is energized and de-energized;
   a main body forming at least a part of an outer shell of the exposed portion;
   a connector portion projected from the main body in the exposed portion, the connector portion configured to be connected with a wiring for the solenoid actuator portion;
   at least one protrusion projected radially outward from a sidewall of the main body in the exposed portion, all of the at least one protrusion located at a position different from the connector portion in a circumferential direction of the sidewall, the at least one protrusion configured to form a clearance with the mounting surface in an axial direction; and
   a bracket of different construction than the main body is radially protruding outward from the sidewall of the main body to engage the mounting surface and holds the solenoid actuator in position, the bracket at the all of the at least one protrusion out of alignment with one another.

2. The solenoid actuator according to claim 1, wherein the at least one protrusion is a plurality of protrusions.

3. The solenoid actuator according to claim 2, wherein the plurality of protrusions includes a singular particular protrusion,
   the main body has a center axis perpendicular to a flat surface, which includes a base line and a boundary line,
   the base line is a straight line connecting the singular particular protrusion with the center axis,
   the boundary line is a straight line perpendicular to the base line and passing through the center axis,
   the plurality of protrusions includes at least one other protrusion, which is other than the singular particular protrusion, and
   the at least one other protrusion is located on an opposite side of the boundary line from the singular particular protrusion.

4. The solenoid actuator according to claim 1, wherein
   the at least one protrusion is located along an end of the main body in the sidewall of the main body, and
   the end of the main body is farthest in the sidewall from the mounting surface in the axial direction.

5. The solenoid actuator according to claim 1, wherein the at least one protrusion is integrally formed with the main body.

6. The solenoid actuator according to claim 1, wherein the connector portion and the main body are integrally formed of a resin material.

7. The solenoid actuator according to claim 1, wherein the operating portion is configured to switch a hydraulic pressure control valve, which is integrally equipped in an interior of a valve timing control apparatus.

8. The solenoid actuator according to claim 1, wherein the at least one protrusion is a plurality of protrusions, and the plurality of protrusions are entirely located at a position different from the connector portion in the circumferential direction of the sidewall.

9. The solenoid actuator according to claim 1, wherein all of the at least one protrusion is not located at a same position as a position of the connector portion in the circumferential direction.

10. The solenoid actuator according to claim 9, wherein all of the at least one protrusion does not overlap with the connector portion in the circumferential direction.

11. A solenoid actuator configured to be mounted to a mounting surface, which is an outer surface of an outer wall of an engine, such that an accommodated portion is inserted through a mounting hole, which is formed in the outer wall, into an interior of the engine, and such that an exposed portion, which is other than the accommodated portion, is located outside the engine, the solenoid actuator comprising:
   a solenoid actuator portion configured to generate an electromagnetic force when energized;
   an operating portion configured to operate when the solenoid actuator portion is energized and de-energized;
   a main body forming at least a part of an outer shell of the exposed portion;
   a connector portion projected from the main body in the exposed portion, the connector portion configured to be connected with a wiring for the solenoid actuator portion; and
   at least one protrusion projected radially outward from a sidewall of the main body in the exposed portion, the at least one protrusion located at a position different from the connector portion in a circumferential direction of the sidewall, the at least one protrusion configured to form a clearance with the mounting surface in an axial direction,
   the exposed portion protrudes beyond the mounting surface and has a height in the axial direction, and
   the sidewall of the exposed portion has an outer diameter in a radial direction, and
   the height is less than the outer diameter,
   the solenoid actuator further comprising:
   a bracket of different construction than the main body is radially protruding outward from the sidewall of the main body to engage the mounting surface and holds the solenoid actuator in position, the bracket at the all of the at least one protrusion out of alignment with one another.

* * * * *